(12) United States Patent
Taguchi et al.

(10) Patent No.: US 7,559,005 B2
(45) Date of Patent: Jul. 7, 2009

(54) METHOD AND DEVICE FOR STORING DATA

(75) Inventors: Masakazu Taguchi, Kawasaki (JP); Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 11/335,086

(22) Filed: Jan. 19, 2006

(65) Prior Publication Data

US 2007/0094574 A1    Apr. 26, 2007

(30) Foreign Application Priority Data

Oct. 25, 2005    (JP) .............................. 2005-310406

(51) Int. Cl.
*G11C 29/00* (2006.01)
(52) U.S. Cl. .................. 714/770; 714/800; 714/718
(58) Field of Classification Search .............. 714/7, 714/6, 799, 718, 770, 800
See application file for complete search history.

(56) References Cited

U.S. PATENT DOCUMENTS

| | | | | |
|---|---|---|---|---|
| 5,134,619 | A | * | 7/1992 | Henson et al. ............... 714/770 |
| 5,561,671 | A | * | 10/1996 | Akiyama ..................... 714/799 |
| 5,592,244 | A | | 1/1997 | Vyhmeister ................. 351/158 |
| 6,236,122 | B1 | * | 5/2001 | Maeda et al. ................ 307/125 |
| 7,356,730 | B2 | * | 4/2008 | Ulrich et al. ..................... 714/6 |
| 2003/0231529 | A1 | | 12/2003 | Hetrick et al. |
| 2004/0250161 | A1 | | 12/2004 | Patterson |

FOREIGN PATENT DOCUMENTS

| | | |
|---|---|---|
| JP | 11-154058 | 6/1999 |
| JP | 2003-223289 | 8/2003 |

OTHER PUBLICATIONS

European Official Communication dated Apr. 10, 2008 for corresponding European patent application No. 06000871.1.

* cited by examiner

*Primary Examiner*—Esaw T Abraham
*Assistant Examiner*—Fritz Alphonse
(74) *Attorney, Agent, or Firm*—Greer, Burns & Crain, Ltd.

(57) ABSTRACT

A method is provided for storing data by distributing the data into plural storage units that are accessible independently of one another. The method includes the steps of dividing data to be stored into plural data blocks, generating parity data corresponding to the data blocks, distributing the plural data blocks and the parity data into the storage units to let the storage units store the same, responding to a situation where any of the storage units becomes inaccessible, reconstructing data stored in the storage unit that has become inaccessible before the situation occurs based on data stored in the remaining storage units, dividing the reconstructed data into plural reconstructed data blocks, generating parity data corresponding to the reconstructed data blocks, and distributing the plural reconstructed data blocks and the parity data corresponding thereto into accessible storage units to let the accessible storage units store the same.

6 Claims, 5 Drawing Sheets

(A) THE INITIAL STATE (B)

(C)

(D) THE FINAL STATE

METHOD AND DEVICE FOR STORING DATA

BACKGROUND OF THE INVENTION

1. Field of the Invention

The present invention relates to a method and device for storing data with the data being distributed. In particular, the present invention is suitable for data storage using hard disk drives.

2. Description of the Related Art

Magnetic disk devices have recently been used in various types of equipment such as car navigation systems and portable music players with a neck strap, in addition to external storage devices for computers. Along with this diversification, environment to be expected for the use expand to include severe environment where temperature or humidity fluctuates substantially and where major impact is applied in unspecified directions. Even when usage patterns of magnetic disk devices are diversified as described above, the importance of preventing data loss remains unchanged.

Magnetic disk devices including hard disk drives are configured to have a closed shape for preventing dust from adhering to disks. In practice, however, the inside is connected to the outside air through a filter. The reason for the closed shape is that a head is placed only an extremely short distance of approximately 10 nm above a spinning disk for record and reproduction (for writing and reading). Such a closed structure is called a disk enclosure, i.e., a DE for short. The DE houses a head gimbal assembly (HGA), a voice coil motor (VCM), a head amplifier (HDA) and a spindle motor (SPM) together with a disk. Some disk enclosures house plural disks for the purpose of increasing storage capacity.

Redundant Arrays of Inexpensive Disks (RAID) in which plural magnetic disk devices are combined is widely known as a technique for enhancing reliability of data storage using magnetic disk devices. The RAID generally adopted is the technique for giving certain redundancy to data to distribute the data to plural magnetic disk devices for record. For example, Japanese Unexamined Patent Publication No. 2003-223289 describes a system that is made up of N magnetic disk devices and generates (N−1) striping data corresponding to data to be recorded and one piece of parity data, and then to record the total N pieces of data in one magnetic disk device. Such a RAID makes it possible to reconstruct data even when any of the magnetic disk devices fail, leading to prevention of data loss.

In conventional RAID systems, when any of plural magnetic disk devices included in a system fail, a process for making data redundant is impossible unless the failed magnetic disk device is replaced with another normal magnetic disk device. This reduces the reliability of the system. In addition, when the system continues to operate with the failed magnetic disk device being left as is and another magnetic disk device also fails, the system is rendered unavailable. Stated differently, in order to maintain the initial reliability, the conventional RAID systems involved performing maintenance of reconstructing the number of magnetic disk devices that operate normally every time when failure occurs.

The necessity of such maintenance is not preferable in equipment for personal use such as car navigation systems or music players. Because users are forced to take time for asking dealers for repair and are forced to absorb the cost of component replacement.

SUMMARY OF THE INVENTION

The present invention is directed to solve the problems pointed out above, and therefore, an object of the present invention is to realize a data storage device that is capable of maintaining the initial reliability over a long period of time.

According to one aspect of the present invention, a method capable of attaining the object is a method for storing data by distributing the data into plural storage units that are accessible independently of one another. The method includes the steps of dividing data to be stored into plural data blocks, generating first parity data corresponding to the plural data blocks, distributing each of the plural data blocks and the first parity data into the plural storage units to let the storage units store the plural data blocks and the first parity data, responding to a situation where any of the plural storage units becomes inaccessible, reconstructing data stored in the storage unit that has become inaccessible before the situation occurs based on data stored in the remaining storage units, dividing the reconstructed data into plural reconstructed data blocks, generating second parity data corresponding to the plural reconstructed data blocks, and distributing each of the plural reconstructed data blocks and the second parity data into plural accessible storage units to let the accessible storage units store the plural reconstructed data blocks and the second parity data.

In the present invention, every time when the number of inaccessible storage units increases, "redundancy" of data to be stored is changed. Here, the "redundancy" is defined as the ratio $(m/(M+m))$ of the number m of parity data to the sum $(M+m)$ of the number M of data blocks corresponding to a certain piece of data to be stored and the number m of parity data.

The present invention makes it possible to realize a long-lived data storage device where the initial reliability can be maintained over a long period of time.

These and other characteristics and objects of the present invention will become more apparent by the following descriptions of preferred embodiments with reference to drawings.

DESCRIPTION OF THE PREFERRED EMBODIMENTS

Figure 1:
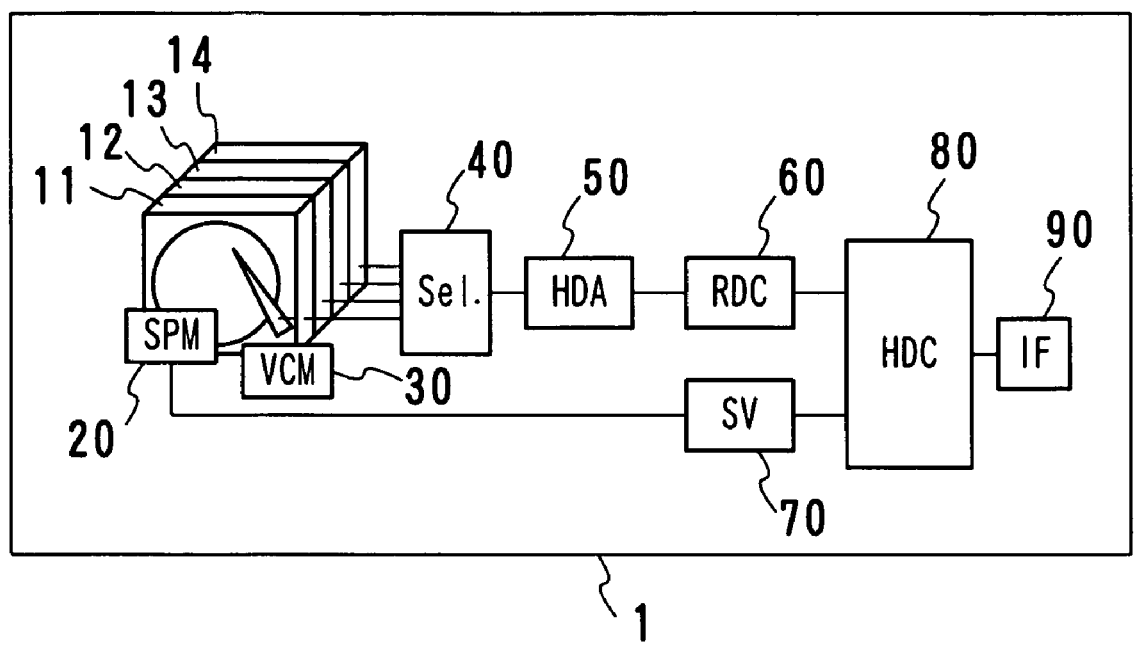
FIG. 1 is a diagram showing a structure of a magnetic disk device according to the present invention.

FIG. 1 is a diagram showing a structure of a magnetic disk device according to the present invention.

The magnetic disk device 1 includes four disk enclosures (hereinafter, referred to as DEs) 11, 12, 13 and 14 with the same structure, a spindle motor (SPM) 20, a voice coil motor (VCM) 30, a selector (Sel.) 40, a head amplifier (HDA) 50, a read channel 60, a servo circuit (SV) 70, a controller (HDC) 80 and an interface 90.

Each of the DEs 11-14 corresponds to a storage unit according to the present invention. The illustrated DE 11 houses at least one disk as a recording medium and a head gimbal assembly. Likewise, each of the DEs 12-14 houses one disk and a head gimbal assembly. There are provided only one spindle motor (SPM) 20 for spinning disks and only one voice coil motor (VCM) 30 for performing seek operations. The spindle motor 20 and the voice coil motor 30 are placed outside the four DEs 11-14. The spindle motor 20 spins all the disks in the DEs 11-L14 at the same time and the voice coil motor 30 drives all the head gimbal assemblies in the DEs 11-14 at the same time.

The selector 40 selects one of the four DEs 11-14 responding to designation by the controller 80. The head amplifier 50 amplifies data signals. The read channel 60 performs modulation and demodulation of record/reproduction, equalization of waveforms and signal discrimination processes. The servo circuit 70 controls spins of the disks. The controller 80 operates to control the entire device including processes pertaining to data storage unique to the present invention. The interface 90 operates to exchange data and control signals with external data processing equipment.

In the structure where one spindle motor 20 is used to spin media, as is the case for the magnetic disk device 1 in this example, disks spin synchronously in the DEs, leading to record/reproduction at high speeds. The small diameter of disks offers advantages in improvement of impact resistance.

Figure 2:
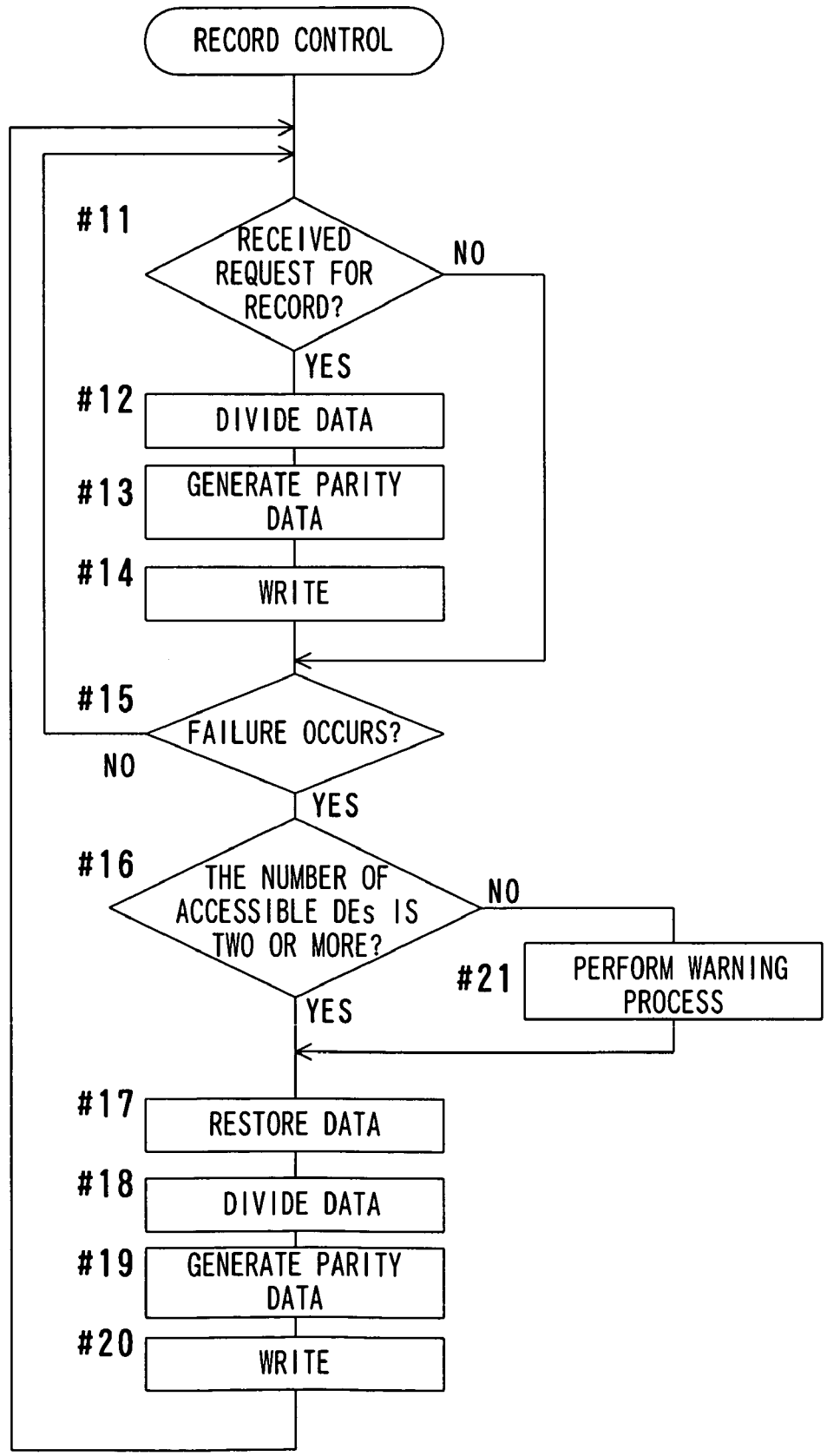
FIG. 2 is a flowchart showing an outline of record control according to the present invention.
Figure 3:
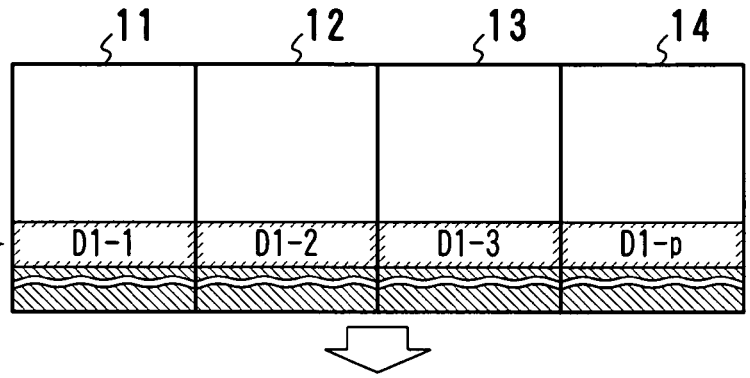
FIG. 3 is a diagram for explaining storage of redundancy-variable data according to the present invention.
Figure 3:
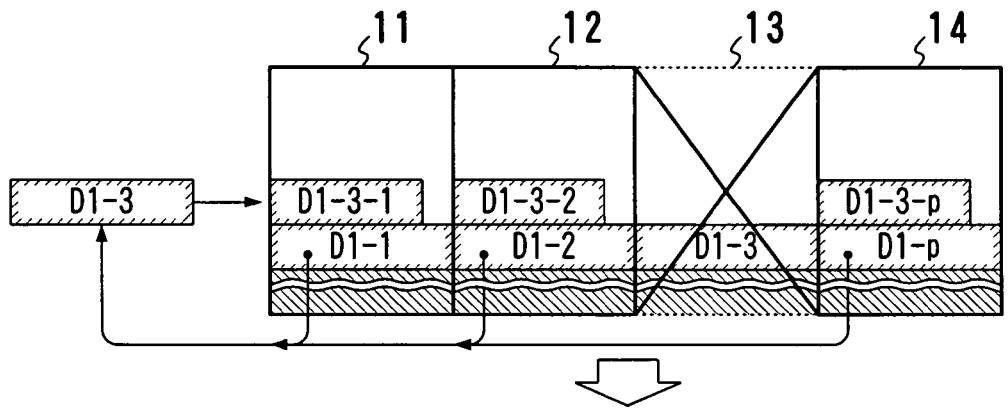
Figure 3:
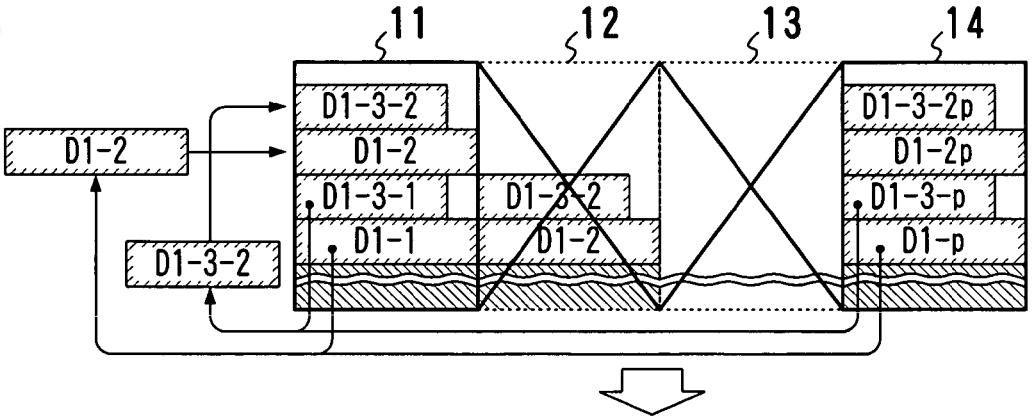
Figure 3:
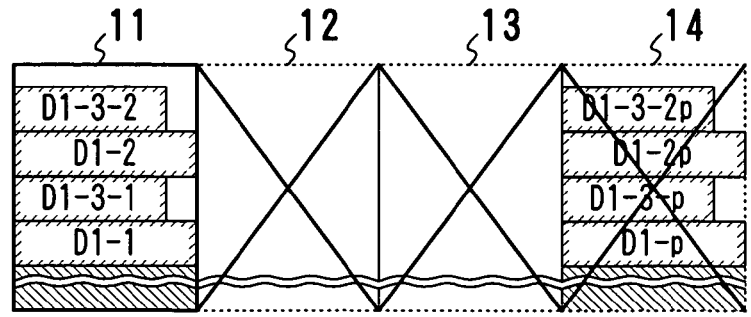

FIG. 2 is a flowchart showing an outline of record control according to the present invention and FIG. 3 is a diagram for explaining storage of redundancy-variable data according to the present invention.

The controller 80 performs the record control shown in FIG. 2. This record control is realized by a control program that is recorded in the controller 80 in advance.

When receiving a request for record from an external device, the controller 80 divides data that are to be recorded and are obtained via the interface 90 into data whose number is the number that is obtained by subtracting one from the number of DEs operating normally at the time point (#11 and #12 in FIG. 2). Then, parity data that correspond to the data blocks thus obtained by the division are generated (#13). After that, the data blocks and the parity data are distributed to the DEs and are written thereinto (#14).

Referring to FIG. 3(A), for example, in the case of the initial state where all the four DEs 11-14 operate normally, data D1 to be recorded are divided into three (=4−1) data blocks D1-1, D1-2 and D1-3, and then parity data D1-$p$ are generated using the exclusive OR operation of the data blocks. Then, the data blocks D1-1, D1-2 and D1-3 and the parity data D1-$p$ are written into the DE 11, DE 12, DE 13 and DE 14 respectively. When all the data are finished being written, File Allocation Tables (FAT) that are previously provided in the DEs 11-14 are updated.

Such a process is the same as the case of conventional methods and is performed every time when a request for record is received from an external device. Shaded areas shown in FIG. 3(A) indicate data that have been written before the data blocks D1-1, D1-2 and D1-3 and the parity data D1-$p$ are written. It is possible to fix the DE into which parity data are written or possible to change the same appropriately.

Referring back to FIG. 2, when a notice indicating that any of the DEs 11-14 fails is received from a process that monitors success and failure of record/reproduction operations (#15), it is checked whether or not the number of accessible DEs is two or more (#16). When there is only one accessible DE, in other words, when two of the DEs already failed and failure this time occurs in second to last DE, it is impossible to make data storage redundant and further recorded data may be lost. Accordingly, a warning process is performed for requesting an external device to inform a user (#21).

In contrast, when there are two or more accessible DEs, a storage reorganization process, which is unique to the present invention, is performed in the following manner.

First, data that were stored in a DE that has become inaccessible before the DE becomes inaccessible are reconstructed based on data that are stored in the remaining storage units (#17). Secondly, the reconstructed data are divided into data whose number is the number that is obtained by subtracting one from the number of DEs operating normally at the time point (#18). Parity data are generated that correspond to the one or more reconstructed data blocks thus obtained by the division (#19). Lastly, the reconstructed data blocks and the parity data are distributed to plural accessible storage units and are stored therein (#20).

The operations mentioned above are described again with reference to FIG. 3.

Suppose that the data blocks D1-1, D1-2 and D1-3, and the parity data D1-$p$ are recorded as shown in FIG. 3(A) and after that the DE 13 fails as shown in FIG. 3(B), for example. In practically, it is usually the case that after the data blocks D1-1, D1-2 and D1-3, and the parity data D1-$p$ are recorded and before the DE 13 fails, further data blocks and parity data are recorded in the DE 11-DE 14. In this example, however, attention is focused on the illustrated data blocks D1-1, D1-2 and D1-3 and processes to be performed thereon are described for easy understanding. The processes are performed in the same way on other data blocks that are already stored.

Since the DE 13 fails, the data block D1-3 that were stored in the DE 13 before the failure are reconstructed based on the data blocks D1-1 and D1-2 and the parity data D1-$p$ that are stored in the remaining DE 11, DE 12 and DE14 respectively using the exclusive OR operation. The reconstructed data block D1-3 is divided into two (=3−11) reconstructed data blocks D1-3-1 and D1-3-2 and then parity data D1-3-$p$ are generated that correspond thereto. After that, the reconstructed data blocks D1-3-1 and D1-3-2 and the parity data D1-3-$p$ are distributed to the DE 11, the DE 12 and the DE 14 respectively, to be stored in the same respectively.

Stated differently, as shown in FIGS. 3(A) and 3(B), responding to failure of any of the DE 11-DE 14, all the information that was stored in the failed DE 11, DE 12, DE 13 or DE 14 before the failure is recorded once again in the remaining DE 11, DE 12 or DE 14 other than the failed DE in a distributed manner. Before the failure, the number M of data blocks is three, the number m of parity data is one and the redundancy is ¼. In contrast, after the failure, the redundancy is ⅓. While the capacity factor of the storage area decreases with increasing the redundancy, existing information is retained and the same reliability as before is obtained. In other words, even if any further DE fails, data loss can be avoided.

Further, suppose that the DE 12 fails as shown in FIG. 3(C).

Since the DE 12 fails, the reconstructed data block D1-3-2 that were stored in the DE 12 before the failure are reconstructed based on the reconstructed data block D1-3-1 and the parity data D1-3-$p$ that are stored in the remaining DE 11 and DE 14 respectively. The reconstructed data block D1-3-2 thus reconstructed is combined with the reconstructed data block D1-3-1 that is stored in the DE 11 to reproduce the data block D1-3. The data block D1-2 are reconstructed based on the data block D1-3 thus reproduced and the data block D1-1 and the parity data D1-*p* that are stored in the DE 11 and the DE 14 respectively. After that, the reconstructed data block D1-2 and parity data D1-2*p* corresponding thereto are distributed to the DE 11 and the DE 14 respectively, to be stored in the same respectively. At the same time, the reconstructed data block D1-3-2 thus reconstructed and parity data D1-3-2*p* corresponding thereto are distributed to the DE 11 and the DE 14 respectively, to be stored in the same respectively. Along with this, the redundancy is changed to ½.

Moreover, as shown in FIG. 3(D), the failure of the DE 14 causes the final state where only one DE 11 is accessible. In this final state also, data that are stored in the DE 11 can be used to reconstruct the data block D1-2, so that the original data D1 can be reproduced. The redundancy, however, is zero. When the DE 11 fails afterward, all the information is naturally lost. Thus, it is desirable that when the unit reaches the final state at the latest, a user is notified that the unit has little time left to live. It is possible to notify the user accordingly before the unit reaches the final state.

Figure 4:
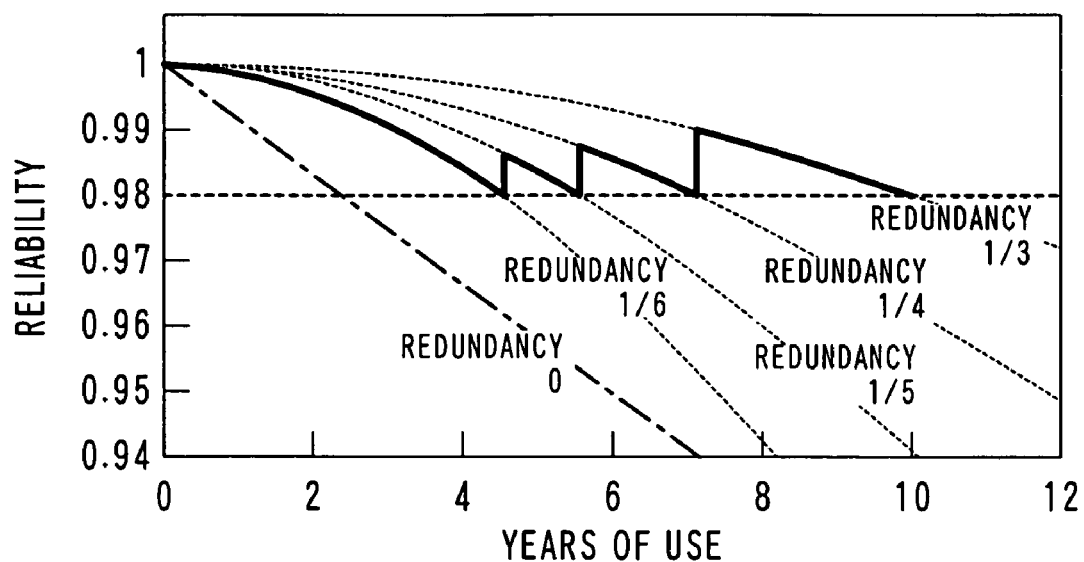
FIG. 4 is a graph showing maintenance of reliability according to the present invention.
Figure 5:
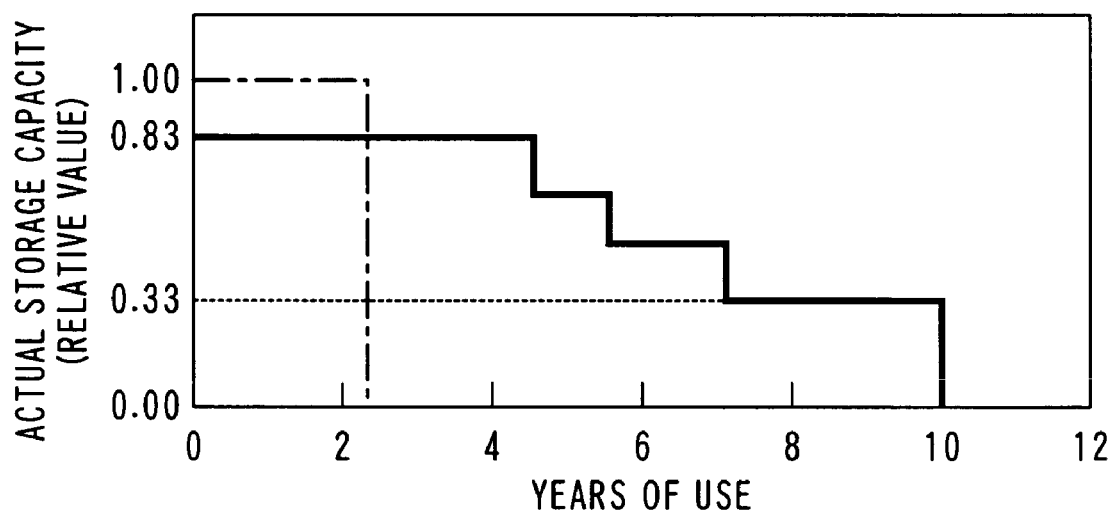
FIG. 5 is a graph showing improvement of a life according to the present invention.

FIG. 4 is a graph showing maintenance of reliability according to the present invention and FIG. 5 is a graph showing improvement of a life according to the present invention. The examples illustrated in FIGS. 4 and 5 show the case where a magnetic disk device is made up of six DEs whose Mean Time Between Failures (MTBF) is equivalent to that of conventional typical magnetic disk devices. The tolerance lower limit of reliability is set to 0.98 in this example.

As described above, the redundancy is changed and the data record operation is continued, leading to the maintenance of reliability of data security and the longer life. As represented by a dot-dash line in FIG. 4, in the case of conventional hard disk drives, when two years have passed after starting on the same, the reliability drops down to approximately 0.98. In contrast, in the case of magnetic disk devices to which the present invention is applied, the magnetic disk devices reach the first time point when the reliability drops down to 0.98 when four to five years have passed after starting on the same. If one DE fails at the first time point, the redundancy is changed and the reliability becomes larger than 0.98. Then, after the time passes again, it comes to the second time point when the reliability drops down to 0.98. Further change of the redundancy causes the reliability to have a value larger than 0.98. By such repetition, the years of use before the redundancy reaches ⅓ and the reliability reaches 0.98 is ten years or more, which means that high reliability is continuously maintained five times longer than the conventional cases.

FIG. 5 shows a comparative example of recordable/reproducible capacity. The initial capacity is lower than the conventional example indicated by a dot-dash line by capacity corresponding to the larger redundancy. Suppose that, however, failure occurs averagely when the reliability reaches a value of 0.98. In such a case, record/reproduction processes become wholly impossible after approximately two and a half years have passed in conventional cases. In contrast, while capacity of the magnetic disk device according to the present invention gradually becomes lower, it can perform record/reproduction processes over ten years or more even if the magnetic disk device stops being used at the time point of the redundancy ⅓. More specifically, it should be understood that the magnetic disk device according to the present invention has a long life.

FIGS. 6A-6D show modifications of the device structure. In FIGS. 6A-6D, structural elements corresponding to those in FIG. 1 are denoted by the same reference marks as in FIG. 1.

Figure 6A:
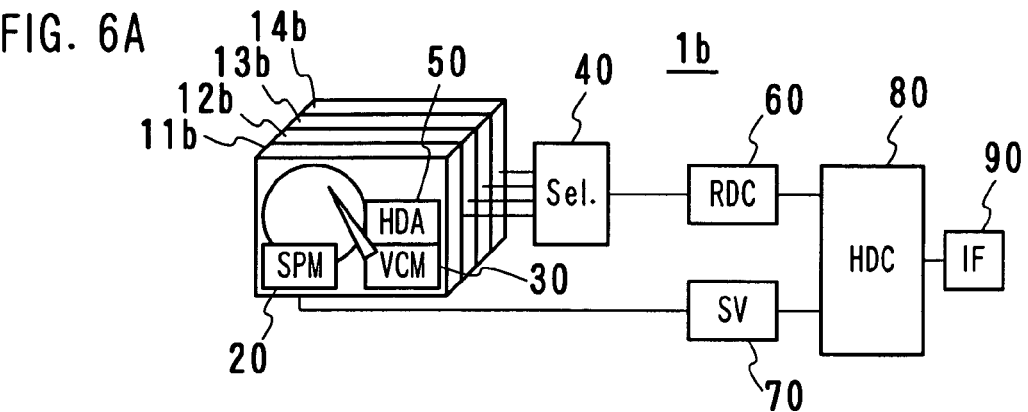
FIGS. 6A-6D show modifications of the device structure.

A magnetic disk device 1*b* shown in FIG. 6A is characterized in that four DEs 11*b*, 12*b*, 13*b* and 14*b* include the spindle motor 20, the voice coil motor 30 and the head amplifier 50 each.

Figure 6B:
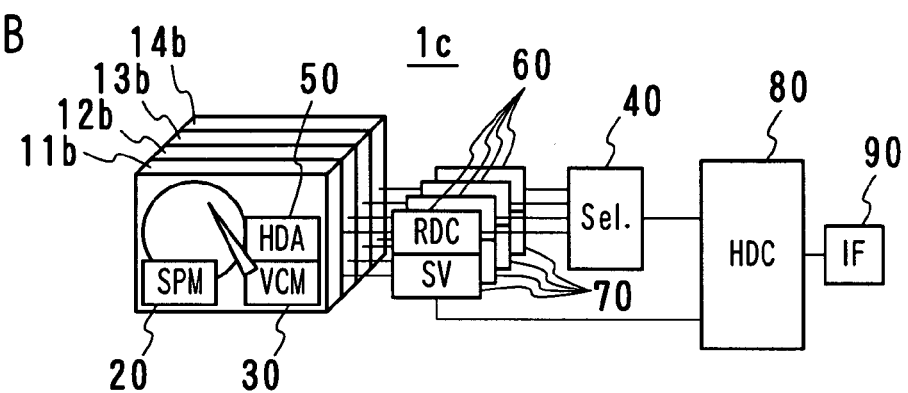

A magnetic disk device 1*c* shown in FIG. 6B is characterized in that each of the four DEs 11*b*, 12*b*, 13*b* and 14*b* is provided with the read channel 60 and the servo circuit 70.

Figure 6C:
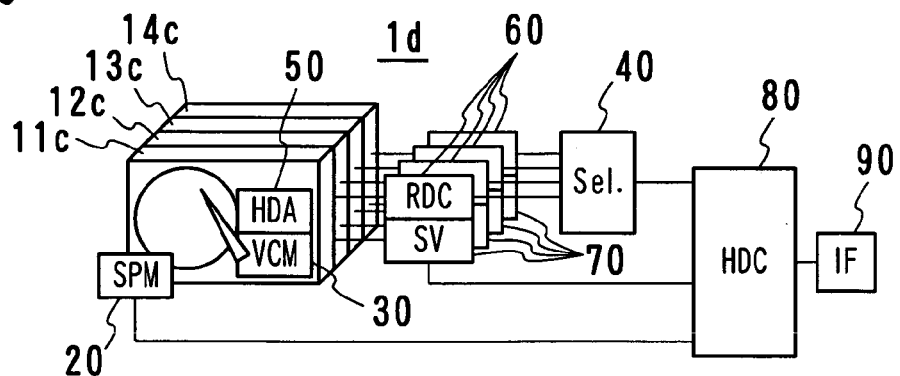

A magnetic disk device 1*d* shown in FIG. 6C is characterized in that four DEs 11*c*, 12*c*, 13*c* and 14*c* include the voice coil motor 30 and the head amplifier 50 each and one spindle motor 20 is provided for all the DEs 11*c*-14*c*.

Figure 6D:
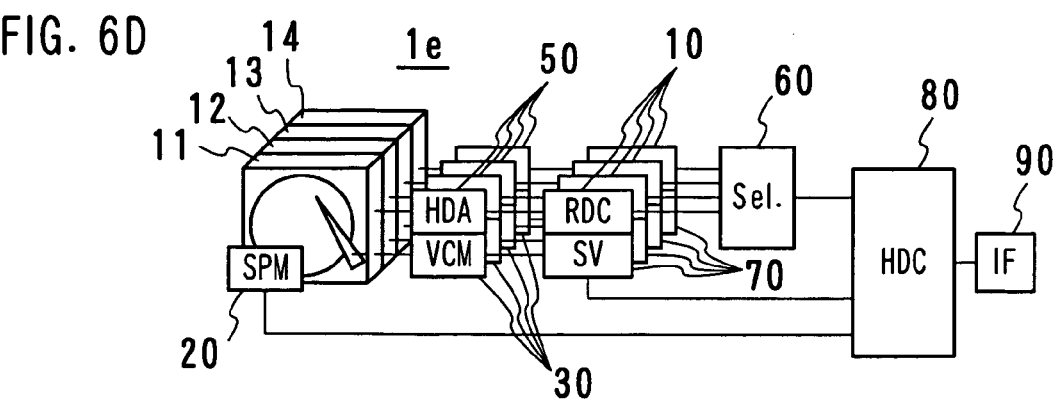

A magnetic disk device 1*e* shown in FIG. 6D is characterized in that it includes the four DEs 11-14 in the same manner as in the example shown in FIG. 1 and each of the four DEs 11-14 is provided with the voice coil motor 30 and the head amplifier 50. According to this example, an electric circuit is arranged outside the DEs 11-14, which is suitable for integration of circuits.

In the embodiments described above, plural magnetic disk devices having the same structure as the magnetic disk device 1 may be combined with one another to establish a RAID system, similarly to conventional cases. The magnetic disk device 1 may be structured as one archive device. The number of DEs 11-14 is not limited to four as illustrated in the embodiments and is arbitrary, providing that it is three or more.

The present invention is suitable for fixed disk devices and also applicable to storage devices including any storage medium such as an optical disk, a magneto-optical disk or a semiconductor memory except a magnetic disk.

The present invention contributes to provision of highly-convenient usage patterns of various types of data storage devices including magnetic disk devices.

While example embodiments of the present invention have been shown and describe, it will be understood that the present invention is not limited thereto, and that various changes and modifications may be made by those skilled in the art without departing from the scope of the invention as set forth in the appended claims and their equivalents.

What is claimed is:

1. A method for storing data with a controller by distributing the data into plural storage units that are accessible independently of one another; the method comprising:
   dividing data to be stored into plural data blocks;
   generating first parity data corresponding to the plural data blocks;
   distributing the plural data blocks and the first parity data into the plural storage units to let the storage units store the plural data blocks and the first parity data;
   responding to a situation where any of the plural storage units becomes inaccessible, reconstructing data stored in the storage unit that has become inaccessible before the situation occurs based on data stored in the remaining storage units;
   dividing the data thus reconstructed into plural reconstructed data blocks;
   generating second parity data corresponding to the plural reconstructed data blocks; and
   distributing the plural reconstructed data blocks and the second parity data corresponding to the plural reconstructed data blocks into plural accessible storage units of the plural storage units to let the accessible storage units store the plural reconstructed data blocks and the second parity data.

2. The method according to claim 1, further comprising, every time when one storage unit becomes inaccessible, reconstructing and dividing data stored in the storage unit that has become inaccessible to let the accessible storage units store reconstructed data blocks and parity data until the number of accessible storage units reaches one.

3. A data storage device comprising:
   plural storage units that are accessible independently of one another; and
   a controller for letting the plural storage units store data, the controller including
   a portion for dividing data to be stored into plural data blocks;
   a portion for generating first parity data corresponding to the plural data blocks;
   a portion for distributing the plural data blocks and the first parity data into the plural storage units to let the storage units store the plural data blocks and the first parity data;
   responding to a situation where any of the plural storage units becomes inaccessible, a portion for reconstructing data stored in the storage unit that has become inaccessible before the situation occurs based on data stored in the remaining storage units;
   a portion for dividing the data thus reconstructed into plural reconstructed data blocks;
   a portion for generating second parity data corresponding to the plural reconstructed data blocks; and
   a portion for distributing the plural reconstructed data blocks and the second parity data corresponding to the plural reconstructed data blocks into accessible storage units of the plural storage units to let the accessible storage units store the plural reconstructed data blocks and the second parity data.

4. The data storage device according to claim 3, wherein each of the plural storage units is a closed structure that houses a storage medium therein.

5. The data storage device according to claim 4, wherein the plural storage units include one or more magnetic hard disk drives as a storage medium.

6. The data storage device according to claim 3, further comprising a portion for notifying when the number of accessible storage units is reduced to a predetermined number.

* * * * *